US009695373B2

(12) United States Patent
Moneyhun

(10) Patent No.: US 9,695,373 B2
(45) Date of Patent: Jul. 4, 2017

(54) SYSTEM AND METHOD FOR NATURAL GAS DEHYDRATION

(71) Applicant: Moneyhun Equipment Sales & Service Co., Inc., Rock Springs, WY (US)

(72) Inventor: David H. Moneyhun, Rock Springs, WY (US)

(73) Assignee: Moneyhun Equipment Sales, Rock Springs, WY (US)

( * ) Notice: Subject to any disclaimer, the term of this patent is extended or adjusted under 35 U.S.C. 154(b) by 411 days.

(21) Appl. No.: 14/471,276

(22) Filed: Aug. 28, 2014

(65) Prior Publication Data

US 2015/0128802 A1      May 14, 2015

Related U.S. Application Data

(63) Continuation-in-part of application No. 13/081,709, filed on Apr. 7, 2011, now Pat. No. 8,876,954.

(60) Provisional application No. 61/322,022, filed on Apr. 8, 2010.

(51) Int. Cl.
    *C10L 3/10*      (2006.01)
    *B01D 53/26*     (2006.01)
    *B01D 53/14*     (2006.01)
    *B01D 53/28*     (2006.01)

(52) U.S. Cl.
    CPC .......... *C10L 3/106* (2013.01); *B01D 53/1425* (2013.01); *B01D 53/263* (2013.01); *B01D 53/28* (2013.01); *B01D 2252/2026* (2013.01); *C10L 2290/02* (2013.01); *C10L 2290/06* (2013.01); *C10L 2290/08* (2013.01); *C10L 2290/12* (2013.01); *C10L 2290/46* (2013.01); *C10L 2290/48* (2013.01); *C10L 2290/541* (2013.01); *C10L 2290/542* (2013.01)

(58) Field of Classification Search
    None
    See application file for complete search history.

(56) References Cited

U.S. PATENT DOCUMENTS

| | | |
|---|---|---|
| 4,332,643 A | 6/1982 | Reid |
| 4,689,053 A | 8/1987 | Heath |
| 5,141,536 A | 8/1992 | Schievelbein et al. |
| 5,163,981 A | 11/1992 | Choi |
| 5,209,762 A | 5/1993 | Lowell |
| 5,346,537 A | 9/1994 | Lowell |
| 5,453,114 A | 9/1995 | Ebeling |
| 5,490,873 A | 2/1996 | Behrens et al. |

(Continued)

OTHER PUBLICATIONS

Outdoor Air—Industry, Business, and Home: Oil and Natural Gas Production; "Optimize Glycol Dehydration System"; www.epa.gov/air/community/details/oil-gas.html printed Mar. 4, 2010.

(Continued)

*Primary Examiner* — Christopher P Jones
*Assistant Examiner* — Phillip Shao
(74) *Attorney, Agent, or Firm* — Thorpe, North & Western, LLP

(57) ABSTRACT

A natural gas dehydration system and method includes a contactor, a flash tank, and a still interconnected by a desiccant circulation system. A reboiler is coupled to the still and the flash tank to burn the flash gas from the flash tank and heat the desiccant. A secondary burner is associated with a vent stack of the reboiler to burn the flash gas from the flash tank when not firing the reboiler.

22 Claims, 7 Drawing Sheets

(56) References Cited

U.S. PATENT DOCUMENTS

| | | |
|---|---|---|
| 5,536,303 A | 7/1996 | Ebeling |
| 5,665,144 A | 9/1997 | Hill et al. |
| 5,766,313 A | 6/1998 | Heath |
| 6,004,380 A | 12/1999 | Landreau et al. |
| 6,183,540 B1 | 2/2001 | Thonsgaard |
| 7,267,775 B2 | 9/2007 | Baudot et al. |
| 2007/0084341 A1 | 4/2007 | Heath et al. |
| 2008/0041228 A1 | 2/2008 | Seibert |
| 2009/0235820 A1 | 9/2009 | Carugati et al. |
| 2010/0281775 A1 | 11/2010 | Logue |
| 2011/0306816 A1 | 12/2011 | Cretoiu et al. |

OTHER PUBLICATIONS

Hicks et al.; "New Process Controls BTEX in direct-fired TEG Reboilers"; OGJ Jun. 12, 2006.

Natural Gas STAR Partners; "Optimize Glycol Circulation and Install Flash Tank Separators"; EPA430-B-03-013; Dec. 2003.

"Continuous Distillation Column"; Armfield; Instruction Manual; UOP3CC; Issue 26; Sep. 2007.

Greenhouse Gas Technology Center Southern Research Institute; Test and Quality Assurance Plan; Jun. 2002; p. 1-8; Greenhouse Gas Technology Center Southern Research Institute; Research Triangle Park, NC.

SYSTEM AND METHOD FOR NATURAL GAS DEHYDRATION

PRIORITY CLAIM

This is a continuation-in-part of U.S. patent application Ser. No. 13/081,709, filed Apr. 7, 2011, now U.S. Pat. No. 8,876,954; which claims priority to U.S. Provisional Patent Application No. 61/322,022 filed on Apr. 8, 2010; which are hereby incorporated herein by this reference in their entirety.

BACKGROUND

Field of the Invention

The present invention relates generally to natural gas dehydration.

Related Art

Natural gas from underground resources is commonly mixed with other hydrocarbons, such as ethane, propane, butane and pentanes; water vapor; hydrogen sulfide; carbon dioxide; helium; nitrogen; etc. The gas is often transported through a network of pipelines that can stretch thousands of miles. The gas is usually processed to separate the various hydrocarbons and fluids to produce pipeline quality dry natural gas. The Gas Processors Association sets forth pipeline quality specifications for gas that the water content should not exceed 7 lb/million standard cubic feet ("MMSCF"). The natural gas from underground resources usually contains a large amount of water, and can be completely saturated. The water can cause problems to the pipeline, such as freezing at low temperatures, and forming hydrates with carbon dioxide and hydrocarbons that can clog equipment and pipes or cause corrosion.

While most of the water is removed from the natural gas at the wellhead by simple methods, dehydration units are often used to remove the water vapor from the gas. One method of removing water vapor utilizes a liquid desiccant dehydrator, such as a glycol dehydrator. Glycol, which has an affinity for water, is used to absorb the water vapor from the natural gas. The natural gas and glycol are brought together in a contactor. The desiccant or glycol bearing the water out of the contactor is referred to as rich or wet and becomes heavier and sinks to the bottom of the contactor where it is removed. The gas with the water vapor removed is referred to as dry gas and exits the contactor to a storage tank. Small amounts of methane and other compounds can also be found in the glycol. A flash tank can also be used to decrease the amount of methane and other compounds by reducing the pressure of the glycol allowing the methane and other hydrocarbons to vaporize or flash. The rich or wet glycol is feed to a stripper or regenerator with a column or still, an overhead condenser, and a reboiler. The stripper or regenerator vaporizes the water vapor, which has a boiling point of 212 degrees Fahrenheit while glycol has a boiling point of 400 degrees Fahrenheit. One problem with prior art strippers or regenerators is that the reboiler runs sporadically, i.e. turns on and off, such that the glycol temperature can vary by 50 degrees.

Dehydrations system also commonly use a jet-gas system which requires a large mass flow of dry jet gas to drive hot glycol circulation in the winter.

Enhancement methods to dehydration systems often involve lowering the pressure in the system to increase stripping, using a vacuum to lower the entire stripper pressure, using stripping gas, using a recoverably hydrocarbon solvent, or withdrawing partially condensed vapors from the bulk liquid in the reboiler.

In addition, cold climates require more thorough and expensive glycol dehydration. Furthermore, new environmental regulations require the removal of BTEX (benzene, toluene, ethylene and xylene) compounds from the still vents of natural gas dehydrators.

Improving the dehydration process is an ongoing endeavor.

SUMMARY OF THE INVENTION

It has been recognized that it would be advantageous to develop an ultra-low emission glycol dehydration unit. In addition, it has been recognized that it would be advantageous to develop a dehydration unit that utilizes flash gas in the reboiler; maintains glycol temperature; eliminates the jet-gas system for hot glycol circulation; uses a flash gas contactor to provide usable fuel gas to the reboiler, even during the winter; utilizes a glycol pump to circulate hot glycol heat trace during the winter that can be bypassed in the summer; and resists or prevents the release of flash gas.

The invention provides a natural gas dehydration system including a contactor, a flash tank, and a still interconnected by a desiccant circulation system. Dry desiccant (such as a lean tri-ethylene glycol (TEG)) enters the contactor along with wet gas to absorb water vapor and leave the contactor as wet desiccant (such as a rich TEG). The wet desiccant enters and leaves the flash tank with flash gas separating in the flash tank. The wet desiccant enters the still with the water vapor vaporizing, and leaves as dry desiccant returning to the contactor. A reboiler is coupled to the still and the flash tank to burn the flash gas from the flash tank and heat the desiccant. A burner associated with the vent stack burns flash gas when not firing the reboiler.

In accordance with a more detailed aspect of the present invention, the system includes a flash gas contactor disposed on the flash tank and coupled to the dry desiccant.

The invention provides a method for dehydrating natural gas, including circulating a desiccant (such as TEG) between a contactor, a flash tank and a still with a reboiler. Wet gas is introduced into the contactor with dry desiccant (such as lean TEG) absorbing water vapor from the wet gas resulting in a wet desiccant (such as rich TEG) and dry gas. Flash gas is extracted from the wet desiccant in the flash tank. The water vapor is removed from the wet desiccant in the still by heating the wet desiccant to vaporize the water vapor resulting in the dry desiccant. The dry desiccant is recirculated from the still to the contactor. The reboiler is fired with the flash gas from the flash tank. The flash gas is burned in a burner associated with a vent stack of the reboiler when not firing the reboiler.

In accordance with a more detailed aspect of the present invention, the method includes bleeding dry, hot desiccant to a flash gas contactor on the flash tank.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 1b is a schematic diagram of the dehydration system of FIG. 1a;

FIG. 2 is a schematic process flow diagram of the dry or lean glycol process flow of the dehydration system of FIG. 1a;

FIG. 3 is a schematic process flow diagram of the wet or rich glycol process flow of the dehydration system of FIG. 1a;

FIG. 4 is a schematic process flow diagram of the dehydrated gas or dry gas process flow of the dehydration system of FIG. 1a;

FIG. 5 is a schematic process flow diagram of the fuel gas process flow of the dehydration system of FIG. 1a; and FIG. 6 is a schematic process flow diagram of the fuel gas process flow of the dehydration system of FIG. 1a.

Figure 1A:
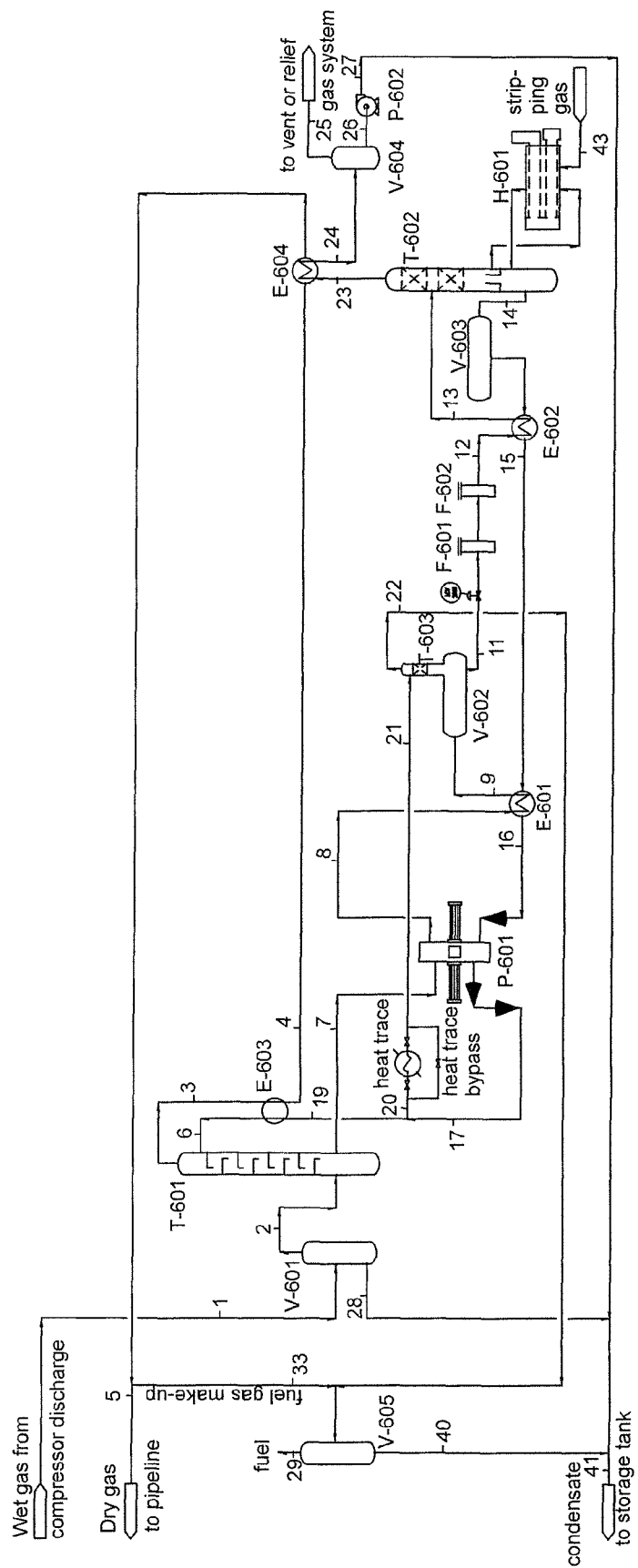
FIG. 1a is a process flow diagram of a natural gas dehydration system in accordance with an embodiment of the present invention.
Figure 1B:
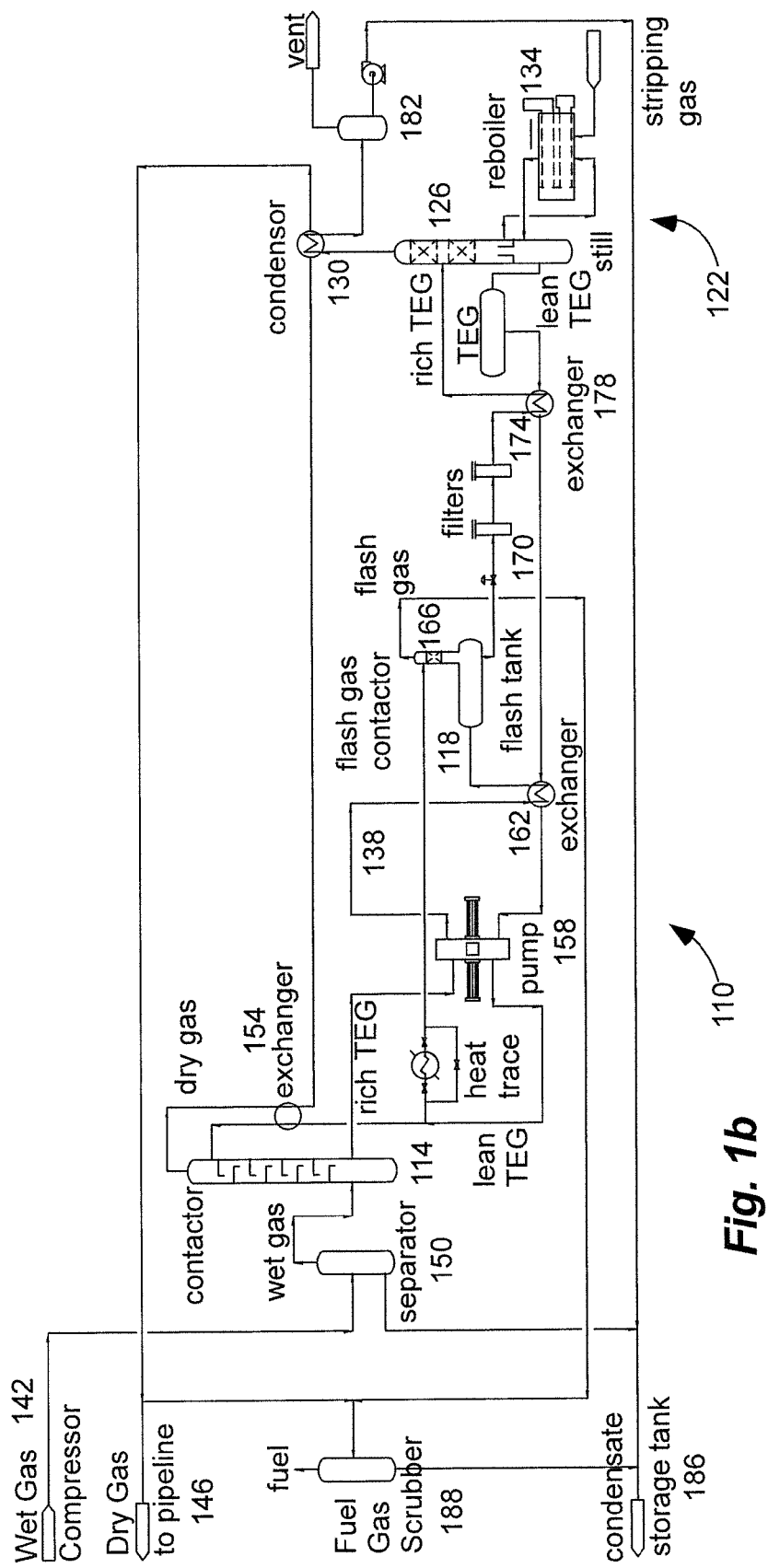
Figure 2:
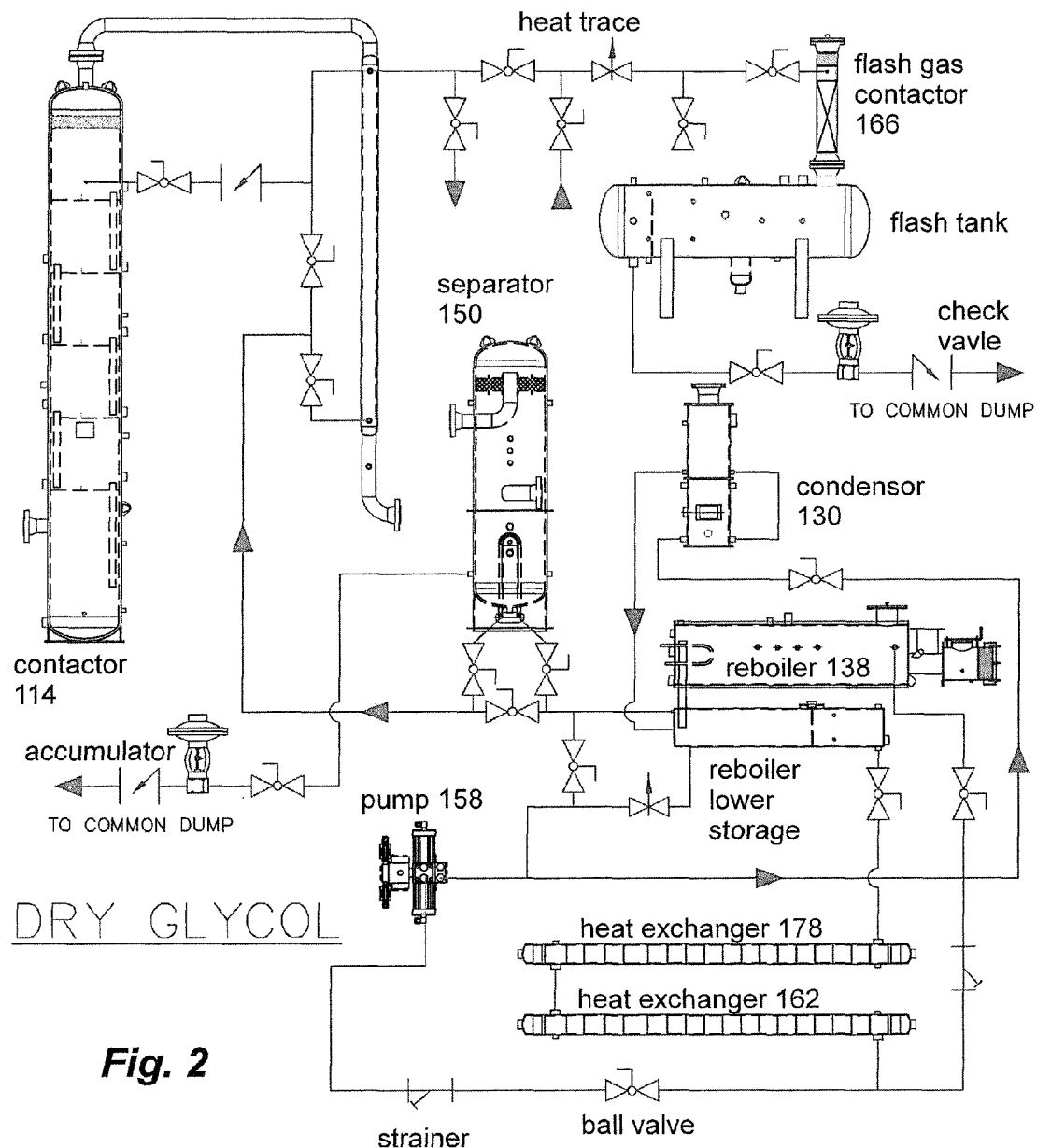
Figure 3:
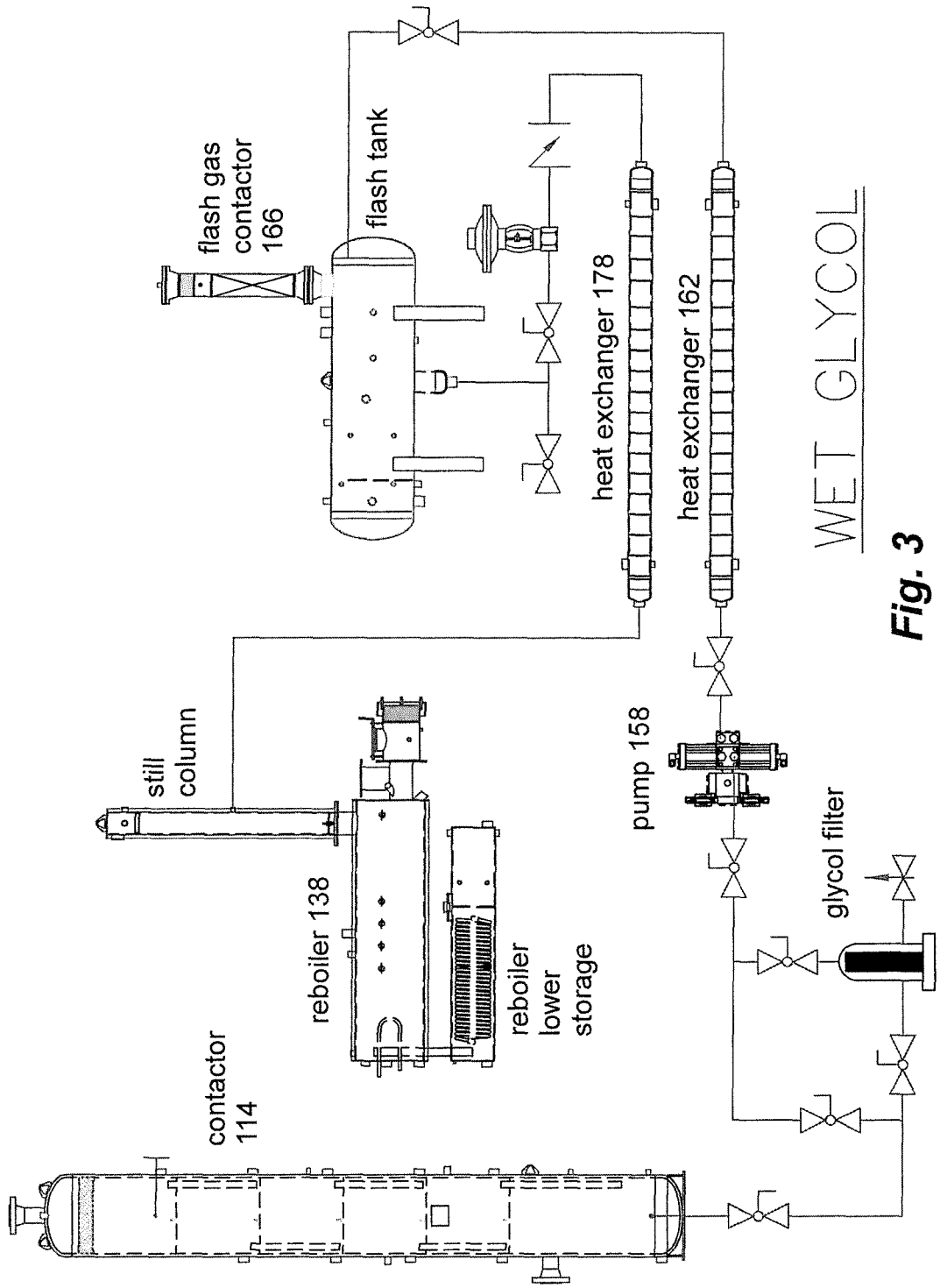
Figure 4:
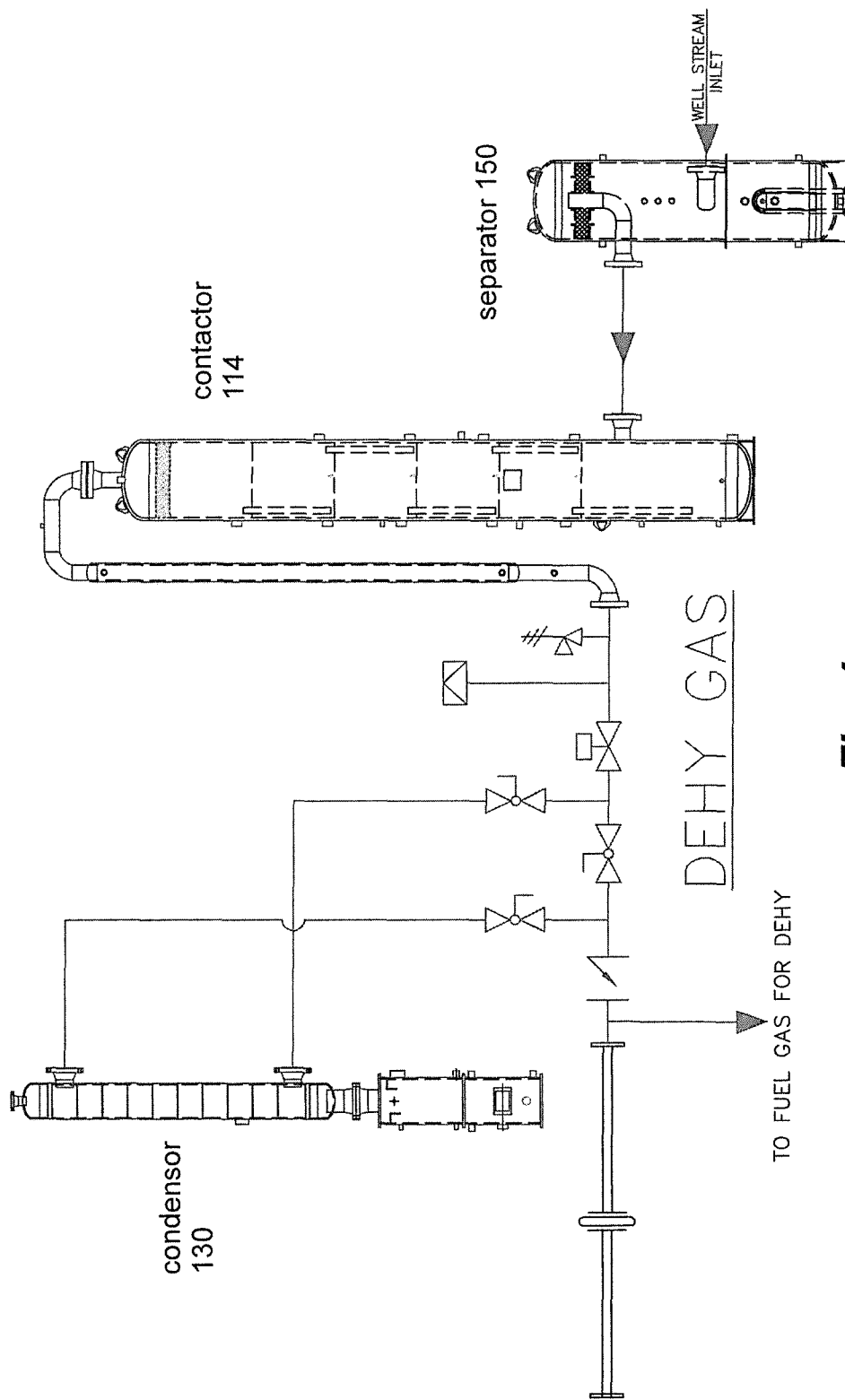
Figure 5:
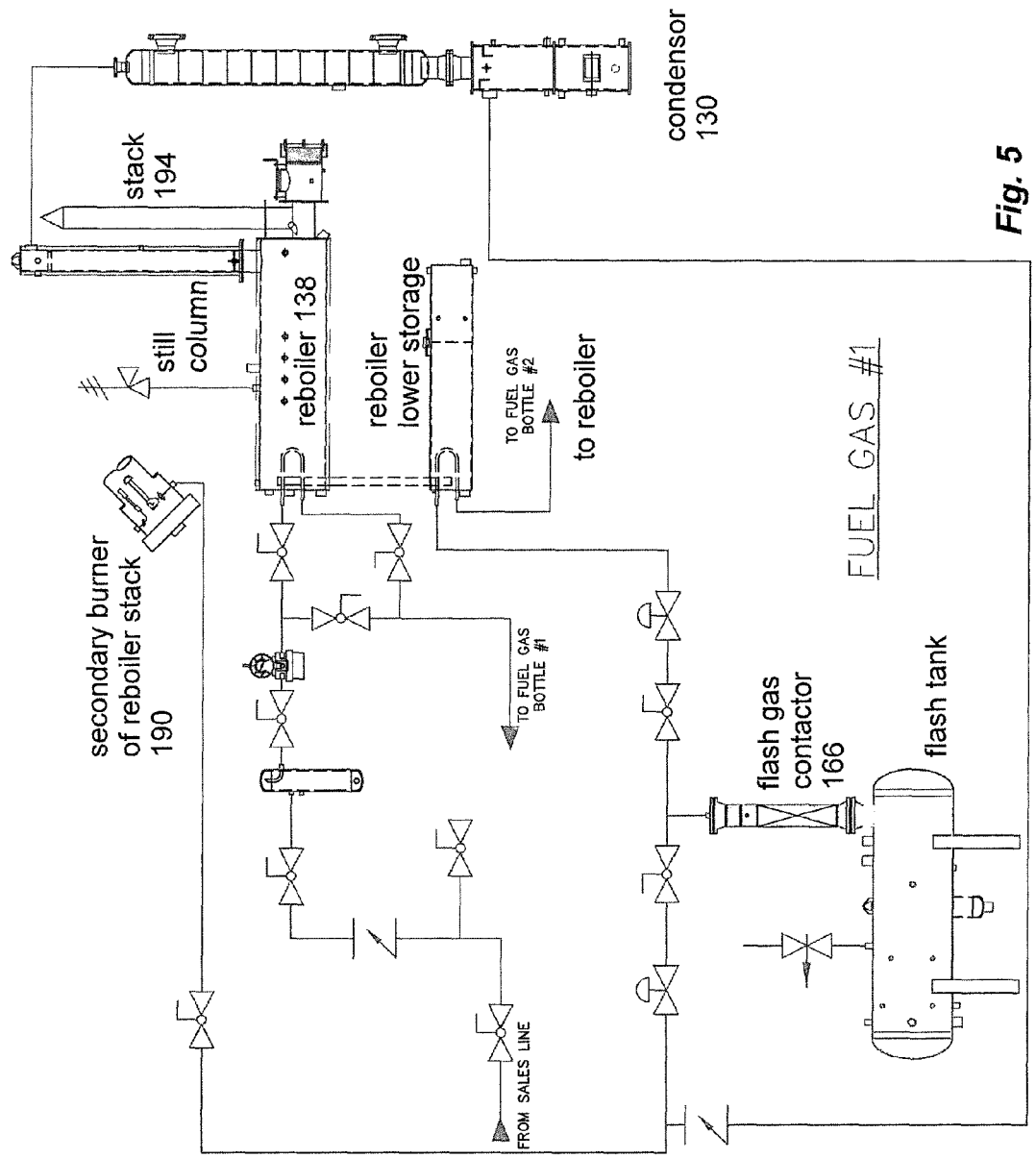
Figure 6:
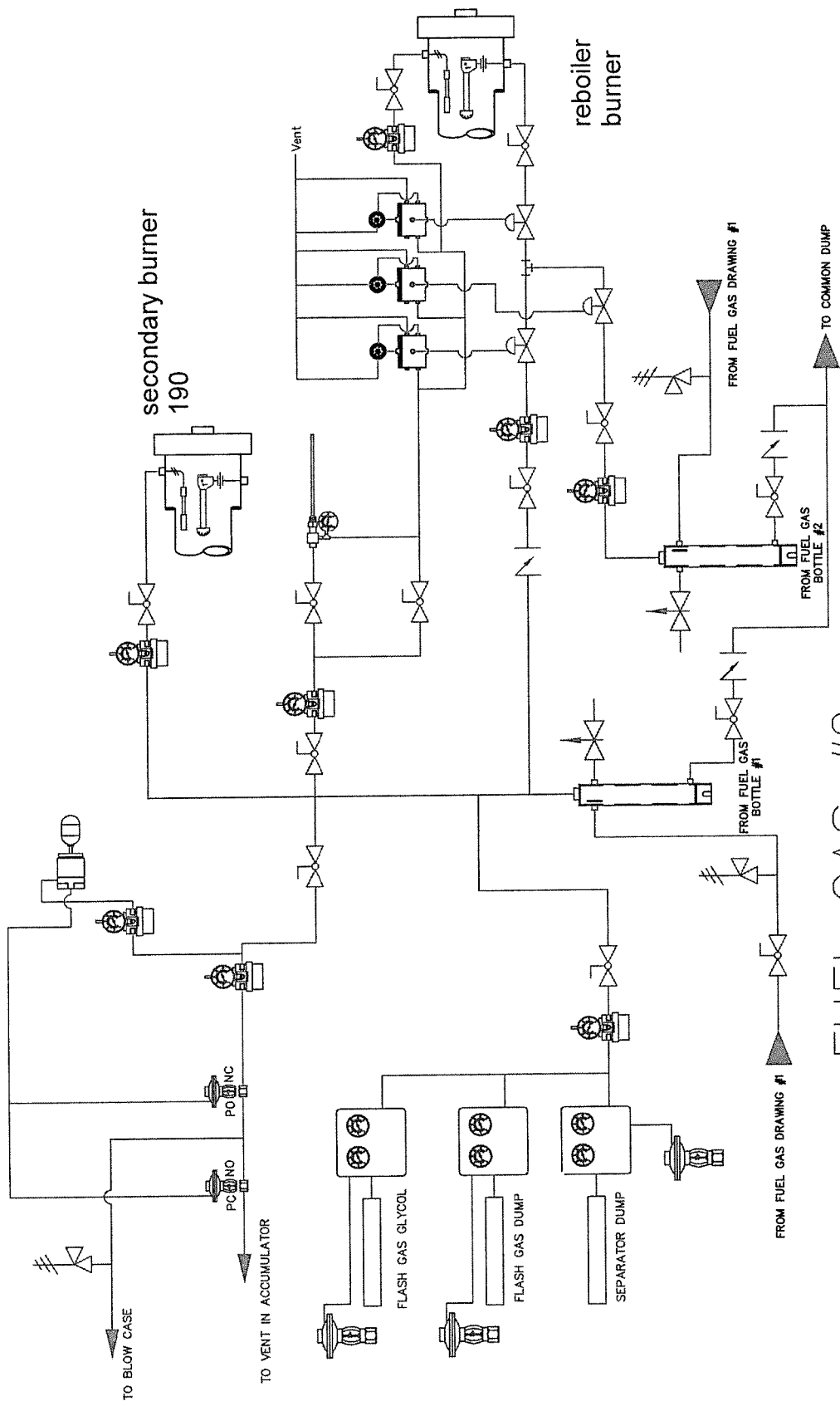

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

As illustrated in FIGS. 1a-6, a natural gas dehydration system, indicated generally at 110, in an example implementation in accordance with the invention is shown for dehydrating natural gas. Such a system can be used in the field at remote operations adjacent one or more well heads for processing natural gas prior to transporting in a pipeline. Alternatively, the system can be used with a plant and can vent hydrocarbon vapors to a relief or fuel gas system. The system can be an ultra-low emission glycol dehydration unit that can sufficiently dehydrate raw, compressed natural gas to less than 7 lbs water/MMSCF gas with total hydrocarbon (THC) emissions of less than six tons per year. In contrast, normal THC emissions are 20 to 80 tons per year. In addition, the system can provide up to 12 MMSCFD of rich gas at 300 PSIG operating pressure, or up to 40 MMSCFD of lean gas at 1000 psig operating pressure. The system can be an absorption type dehydration system using a liquid desiccant, such as glycol or TEG.

Generally speaking, the system 110 can include a contactor 114, a flash tank 118, and a stripper or regenerator 122 with a still 126, an overhead condenser 130 and a reboiler 134. A desiccant or TEG circulation system 138 can interconnect the various components with pipe or tubing. The contactor 114 can be coupled to a wet gas source 142, such as a compressor discharge, and a lean TEG source, such as still 126 or stripper or regenerator 122. In addition, the contactor 114 is coupled to a dry gas storage, such as the pipeline 146 or tank, and a rich TEG outlet that can be coupled to the stripper or regenerator 122. Dry or lean TEG enters the contactor 114 along with wet gas with the TEG absorbing water vapor from the wet gas. After absorbing the water vapor, the TEG becomes wet or rich TEG and accumulates at the bottom of the contactor where it leaves or is withdrawn. The gas with the water vapor removed becomes dry gas and leaves or is withdrawn from the contactor. Thus, lean TEG enters the contactor, absorbs water vapor and leaves the contactor as rich TEG. Similarly, wet gas enters the contactor, has its water vapor absorbed by the TEG, and exits the contactor as dry gas. The wet gas may first pass through an inlet gas separator 150 coupled between the gas source 142 and the contactor 114. The dry gas leaving the contactor and the lean TEG entering the contactor can pass through a gas/glycol heat exchanger 154 which heats the dry gas and cools the lean TEG.

A pump 158 can be coupled to the TEG circulation system to pump lean TEG into the contactor and rich TEG out of the contactor. The wet TEG is withdrawn from the contactor and directed to the flash tank 118 where flash gas separates from the wet TEG. The flash tank 118 can be coupled to rich TEG outlet of the contactor, and can have a rich TEG outlet and a flash gas outlet. The rich TEG can pass through a glycol/glycol heat exchanger 162 along with lean TEG from the stripper on the way to the contactor where the rich TEG temperature is increased and the pressure decreased. For example, the rich TEG temperature can increase 100 to 110 degrees, such as from 92 to 100 degrees Fahrenheit.

In addition, a flash gas contactor 166 can be coupled to the flash tank 118. The flash gas contactor 166 can be coupled to the source of lean TEG to the contactor 114 and an outlet for the flash gas. A heat trace and a heat trace bypass can be coupled in-line between the lean TEG to the flash gas contactor 166. The flash gas can be coupled to a fuel gas scrubber 188 and outlet to a fuel tank or pipeline, which in turn, can be coupled to the reboiler 134 as discussed below. The flash gas contactor provides usable fuel gas to the re-boiler, even during winter conditions.

The rich TEG leaving the flash tank can pass through one or more filters, such as a glycol filter 170 and a glycol charcoal filter 174 to remove impurities that may clog or foul piping or equipment. In addition, the rich TEG can pass through a glycol/glycol heat exchanger 178 coupled to the lean TEG from the stripper to the contactor. Again, the rich TEG temperature is increased and the pressure decreased. For example, the lean TEG temperature can increase 130-140 degrees, such as from 188 to 325 degrees Fahrenheit. Thus, from the contactor 114 to the stripper 122 or still 126, the rich TEG temperature can increase 230-240 degrees.

The rich TEG enters the still 126 and the water vapor vaporizes. The still 126 is coupled to the rich TEG outlet of the flash tank. The water vapor can vent out the top of the still to the overhead vapor condenser 130 that is also coupled to the dry gas leaving the contactor. The water vapor can be accumulated in a liquid accumulator 182 with any waste gas vented or flared, and the liquid pumped to a condensate storage tank 186.

The reboiler 134 takes TEG in the still, heats it, and returns it to the still. Heating the TEG causes the water vapor to boil off the TEG. The reboiler 134 can be coupled to the flash tank and can burn the flash gas. All of the flash gas can be burned in the reboiler 134, without venting or flaring the flash gas. The reboiler can be configured to preferentially consume glycol flash gas over make-up fuel gas. The reboiler 134 can be a continuously fired reboiler that maintains the temperature of the TEG. A control system can be coupled to the reboiler 134 to maintain a temperature of the TEG above a predetermined minimum temperature. As described above, prior art reboilers operate sporadically, resulting in temperature differences of up to 50 degrees in the TEG. When the TEG and/or the reboiler 134 is at operating temperature, or when not firing the reboiler (or burner thereof), the flash gas or excess flash gas can be burned in a secondary burner 190 associated with a vent stack 194 of the reboiler. Thus, excess flash gas is burned rather than vented to the atmosphere. In one aspect, the secondary burner can be carried by the vent stack, and the secondary burner can be coupled to the vent stack at an angle (e.g. substantially 45 degrees) so that the secondary burner exhausts into the vent stack. The lean or dry TEG is withdrawn from the still into a glycol tank, and directed back to the contactor 114 through the heat exchangers 178 and 162 and pump 158. In addition, the heat trace can bleed off the lean TEG to the flash gas contactor 166. The pump 158 is used to circulate hot TEG through the heat trace during winter operation, and can be by-passed during summer operation.

Hydrocarbon liquids are removed from the separator, accumulator, glycol flash tank, fuel-gas system and power-gas system.

A method for dehydrating natural gas, and for using the system described above, includes:

1) introducing wet gas with water vapor and lean TEG into a contactor 114 and allowing the lean TEG to absorb water vapor from the wet gas resulting in rich TEG with water vapor and dry gas;
2) extracting the dry gas and the rich TEG from the contactor;
3) introducing the rich TEG into a flash tank 118;
4) separating flash gas from the rich TEG in the flash tank;
5) directing the rich TEG from the flash tank to a still 126 with a reboiler 134;
6) heating the rich TEG in the reboiler to vaporize the water in the rich TEG resulting in dry TEG;
7) directing the dry TEG from the still back to the contactor 114;
8) heating the TEG by firing the reboiler 134 with the flash gas from the flash tank; and
9) burning flash gas in a burner 190 associated with a vent stack 194 of the reboiler when not firing the reboiler with the flash gas.

The temperature of the TEG in the reboiler can be maintained within at least a 50 degree temperature range. In addition, the TEG can be continuously heated by continuously firing the reboiler. In addition, hot, dry TEG from the still can be circulated to a flash gas contactor 166 disposed on the flash tank 118, such as during winter. The TEG can be pumped through the circulation system, and through the heat trace to the flash gas contactor, with a pump, and without a jet gas system. Furthermore, the flash gas can be washed, particularly in the winter, to remove moisture and heavy hydrocarbons. In addition, all of the flash gas can be burned in the reboiler, without venting or flaring the flash gas.

In addition, a method for dehydrating natural gas, and for using the system described above, includes:

a) circulating a desiccant between a contactor 114, a flash tank 118 and a still 126 with a reboiler 134;
b) introducing wet gas into the contactor with dry or lean desiccant, the dry or lean desiccant absorbing water vapor from the wet gas resulting in a rich or wet desiccant and dry gas;
c) extracting flash gas from the rich or wet desiccant in the flash tank;
d) removing the water vapor from the rich or wet desiccant in the still by heating the rich or wet desiccant to vaporize the water vapor resulting in the dry or lean desiccant;
e) recirculating the dry or lean desiccant from the still to the contactor;
f) firing the reboiler with the flash gas from the flash tank; and
g) burning flash gas in a burner 190 associated with a vent stack 194 of the reboiler when not firing the reboiler with the flash gas.

With specific reference now to FIG. 1a, the following tables represent operational parameters related to different components of one embodiment of the present invention.

TABLE 1

| Description | Units of Measure | Stream No. | | | | |
| --- | --- | --- | --- | --- | --- | --- |
| | | 1 Wet Gas From Compressor | 2 Wet Gas to Contactor | 3 Contactor OVHD | 4 Super-heated Dry Gas | 5 Dry Gas to Pipeline |
| Temperature | F. | 90 | 90 | 95 | 101 | 105 |
| Pressure | PSIA | 365 | 365 | 364.5 | 359.5 | 358.5 |
| Vapor Fraction | | 0.9690 | 1.0000 | 1.0000 | 1.0000 | 1.0000 |
| Mass Flow | LB/HR | 14692.33 | 13149.93 | 13149.93 | 13149.93 | 13146.13 |
| Molar flow | MOL/HR | 67.6000 | 666.2707 | 664.5014 | 664.5014 | 664.3094 |
| STD Gas Flow | MMSCFD | 6.2623 | 6.0681 | 6.052 | 6.052 | 6.0502 |
| Liq. Vol Flow | GPM | — | — | — | — | — |
| Flowing Density | LB/FT$^3$ | 1.480 | 1.340 | 1.320 | 1.280 | 1.260 |
| MOL. WT | LB/LB-MOL | 21.37 | 19.83 | 19.79 | 19.79 | 19.79 |
| TEG | LB/HR | 0.00 | 0.00 | 0.01 | 0.01 | 0.01 |
| H20 | LB/HR | 23.79 | 23.51 | 1.86 | 1.86 | 1.86 |
| Methane | LB/HR | 9578.40 | 9541.26 | 9540.01 | 9540.01 | 9537.25 |
| Ethane | LB/HR | 629.26 | 617.83 | 617.61 | 617.61 | 617.43 |
| Propane | LB/HR | 605.24 | 572.28 | 571.54 | 571.54 | 571.38 |
| Butanes | LB/HR | 797.75 | 692.20 | 691.37 | 691.37 | 691.18 |
| Benzene | LB/HR | 107.21 | 38.10 | 24.55 | 24.55 | 24.55 |
| Toluene | LB/HR | 63.23 | 9.91 | 2.25 | 2.25 | 2.25 |
| Xylenes | LB/HR | 199.12 | 11.43 | 2.00 | 2.00 | 2.00 |

TABLE 2

| | | Stream No. | | | | |
|---|---|---|---|---|---|---|
| | | 6 | 7 | 9 | 11 | 13 |
| | | Lean | Rich | Rich | Rich | Rich |
| | Units of | TEG to | TEG from | TEG to | TEG to | TEG to |
| Description | Measure | Contactor | Contactor | Flash Tank | Filters | still column |
| Temperature | F. | 100 | 92 | 200 | 188 | 325 |
| Pressure | PSIA | 373.4 | 365 | 45 | 45 | 25 |
| Vapor Fraction | | 0.0000 | 0.0000 | 0.0102 | 0.0000 | 0.0154 |
| Mass Flow | LB/HR | 1690.93 | 1754.42 | 1754.42 | 2074.91 | 2074.91 |
| Molar flow | MOL/HR | 12.4281 | 14.1974 | 14.1974 | 164661 | 16.4661 |
| STD Gas Flow | MMSCFD | — | — | — | — | — |
| Liq. Vol Flow | GPM | 3.01 | 3.16 | 3.28 | 3.87 | — |
| Flowing Density | LB/FT$^3$ | 70.120 | 69.260 | 36.030 | 66.790 | 17.190 |
| MOL. WT | LB/LB-MOL | 136.06 | 123.57 | | 126.57 | 126.01 |
| TEG | LB/HR | 1663.52 | 1663.50 | 1663.50 | 1982.17 | 1982.17 |
| H20 | LB/HR | 23.70 | 45.35 | 45.35 | 49.88 | 49.88 |
| Methane | LB/HR | 0.00 | 1.25 | 1.25 | 0.11 | 0.11 |
| Ethane | LB/HR | 0.00 | 0.22 | 0.22 | 0.04 | 0.04 |
| Propane | LB/HR | 0.00 | 0.74 | 0.74 | 0.33 | 0.33 |
| Butanes | LB/HR | 0.00 | 0.82 | 0.82 | 0.39 | 0.39 |
| Benzene | LB/HR | 0.00 | 13.55 | 13.55 | 13.55 | 13.55 |
| Toluene | LB/HR | 0.05 | 7.70 | 7.70 | 7.71 | 7.71 |
| Xylenes | LB/HR | 3.67 | 13.10 | 13.10 | 13.81 | 13.81 |

TABLE 3

| | | Stream No. | | | | |
|---|---|---|---|---|---|---|
| | | | 15 | | 17 | 21 |
| | | 14 | LN TEG to | 16 | LN TEG | LN TEG to |
| | Units of | Ln TEG from | Cold TEG | LN TEG | Pump | Flash Gas |
| Description | Measure | Reboiler | HXR | To Pump | Disch. | Contactor |
| Temperature | F. | 385 | 250 | 149 | 151 | 120 |
| Pressure | PSIA | 18 | 17 | 15 | 390 | 277 |
| Vapor Fraction | | 0.0000 | 0.0000 | 0.0000 | 0.0000 | 45.0000 |
| Mass Flow | LB/HR | 2012.02 | 2012.02 | 2012.02 | 2012.02 | 321.10 |
| Molar flow | MOL/HR | 14.7877 | 14.7877 | 14.7877 | 14.7877 | 2.3600 |
| STD Gas Flow | MMSCFD | — | — | — | — | — |
| Liq. Vol Flow | GPM | 4.05 | 3.81 | 3.66 | 3.65 | 0.65 |
| Flowing Density | LB/FT$^3$ | 61.920 | 65.890 | 68.610 | 68.820 | 69.540 |
| MOL. WT | LB/LB-MOL | 136.06 | 136.06 | 136.06 | 136.06 | 136.06 |
| TEG | LB/HR | 1979.37 | 1979.37 | 1979.37 | 1979.37 | 315.89 |
| H20 | LB/HR | 28.19 | 28.19 | 28.19 | 28.19 | 4.50 |
| Methane | LB/HR | 0.00 | 0.00 | 0.00 | 0.00 | 0.00 |
| Ethane | LB/HR | 0.00 | 0.00 | 0.00 | 2.00 | 0.00 |
| Propane | LB/HR | 0.00 | 0.00 | 0.00 | 0.00 | 1.00 |
| Butanes | LB/HR | 0.00 | 0.00 | 0.00 | 0.00 | 0.00 |
| Benzene | LB/HR | 0.00 | 0.00 | 0.00 | 0.00 | 0.00 |
| Toluene | LB/HR | 0.05 | 0.05 | 0.05 | 0.05 | 0.01 |
| Xylenes | LB/HR | 4.40 | 4.40 | 4.40 | 4.40 | 0.71 |

TABLE 4

| | | Stream No. | | | | |
|---|---|---|---|---|---|---|
| | | | | 25 | 28 | 41 |
| | | 22 | 23 | Waste Gas | Cond. | Total |
| | Units of | Flash Gas | Still Column | to Flare | From | Cond/Water |
| Description | Measure | to Fuel | OVHD Vent | or ATM | Separator | to Tank |
| Temperature | F. | 121 | 325 | 110 | 90 | 72 |
| Pressure | PSIA | 44.5 | 17.5 | 15.5 | 365 | 45 |
| Vapor Fraction | | 1.0000 | 1.0000 | 0.0000 | 0.0000 | 0.1478 |
| Mass Flow | LB/HR | 3.46 | 60.10 | 0.93 | 1478.91 | 1540.87 |
| Molar flow | MOL/HR | 0.1123 | 1.6784 | 0.0211 | 21.3292 | 22.9865 |
| STD Gas Flow | MMSCFD | 0.001 | 0.0153 | 0.0002 | — | — |
| Liq. Vol Flow | GPM | — | — | — | 4.65 | — |
| Flowing Density | LB/FT$^3$ | 0.220 | 0.080 | 0.110 | 39.610 | 3.360 |

TABLE 4-continued

| Description | Units of Measure | Stream No. | | | | |
|---|---|---|---|---|---|---|
| | | 22 Flash Gas to Fuel | 23 Still Column OVHD Vent | 25 Waste Gas to Flare or ATM | 28 Cond. From Separator | 41 Total Cond/Water to Tank |
| MOL. WT | LB/LB-MOL | 30.8 | 37.47 | 44 | 69.34 | 67.03 |
| TEG | LB/HR | 0.00 | 0.01 | 0.00 | 0.00 | 0.01 |
| H20 | LB/HR | 0.01 | 21.69 | 3.03 | 11.42 | 11.44 |
| Methane | LB/HR | 1.14 | 0.11 | 0.11 | 37.14 | 37.15 |
| Ethane | LB/HR | 0.18 | 1.04 | 0.03 | 11.42 | 11.44 |
| Propane | LB/HR | 0.42 | 0.33 | 0.13 | 32.96 | 33.15 |
| Butanes | LB/HR | 0.45 | 0.39 | 0.07 | 105.55 | 105.87 |
| Benzene | LB/HR | 0.00 | 13.55 | 0.18 | 69.10 | 82.47 |
| Toluene | LB/HR | 0.00 | 7.65 | 0.03 | 53.33 | 60.95 |
| Xylenes | LB/HR | 0.00 | 9.41 | 0.01 | 187.68 | 197.07 |

In addition, the following callout numbers have been used specifically in connection with FIG. 1a and have their attendant definitions. V-605 refers to a fuel gas scrubber, V-601 refers to an inlet gas separator, T-601 refers to a glycol contactor, E-603 refers to a gas/glycol exchanger, P-601 refers to cold glycol/glycol exchanger, V-602 refers to a glycol flash tank, T-603 refers to a flash gas contactor, F-601 refers to a glycol filter, V-602 refers to a glycol flash tank, T-603 refers to a flash gas contactor, F-602 refers to a glycol charcoal filter, V-603 refers to a glycol surge tank, E-602 refers to a hot glycol/glycol exchange, E-604 refers to still column vapor condenser, T-602 refers to a glycol still, H-601 refers to a glycol reboiler, V-604 refers to a liquid accumulator, and P-602 refers to an accumulator pump.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for dehydrating natural gas, comprising:
a) circulating a desiccant between a contactor, a flash tank and a still with a reboiler;
b) introducing wet gas into the contactor with dry or lean desiccant, the dry or lean desiccant absorbing water vapor from the wet gas resulting in a rich or wet desiccant and dry gas;
c) extracting flash gas from the rich or wet desiccant in the flash tank;
d) removing the water vapor from the rich or wet desiccant in the still by heating the rich or wet desiccant to vaporize the water vapor resulting in the dry or lean desiccant;
e) recirculating the dry or lean desiccant from the still to the contactor;
f) firing the reboiler with the flash gas from the flash tank;
g) burning flash gas in a burner associated with a vent stack of the reboiler when not firing the reboiler with the flash gas; and
h) circulating dry or lean desiccant from the still to the flash tank.

2. A method in accordance with claim 1, further comprising:
circulating dry or lean desiccant from the still to the flash tank with a heat trace during winter operation; and
by-passing the heat trace during summer operation.

3. A method in accordance with claim 1, further comprising:
directing dry or lean desiccant from the still to a flash gas contactor on the flash tank.

4. A method in accordance with claim 1, further comprising pumping the desiccant with a pump, and without a jet gas system.

5. A method in accordance with claim 1, further comprising:
washing the flash gas to remove moisture and heavy hydrocarbons in the winter.

6. A method in accordance with claim 1, further comprising:
passing rich or wet desiccant after the contactor and before the flash tank through a heat exchanger along with dry or lean desiccant from the still on the way to the contactor; and
passing rich or wet desiccant after the flash tank and before the still through another heat exchanger along with dry or lean desiccant from the still on the way to the contactor.

7. A method in accordance with claim 1, further comprising:
maintaining a temperature of the desiccant in the reboiler within at least a 50 degree temperature range.

8. A method in accordance with claim 1, further comprising:
burning all of the flash gas in the reboiler without venting or flaring the flash gas.

9. A method for dehydrating natural gas, comprising:
a) introducing wet gas with water vapor and lean triethylene glycol (TEG) into a contactor and allowing the lean TEG to absorb water vapor from the wet gas resulting in rich TEG with water vapor and dry gas;
b) extracting the dry gas and the rich TEG from the contactor;
c) introducing the rich TEG into a flash tank;
d) separating flash gas from the rich TEG in the flash tank;
e) directing the rich TEG from the flash tank to a still with a reboiler;
f) heating the rich TEG in the reboiler to vaporize the water in the rich TEG resulting in dry TEG;
g) directing the dry TEG from the still back to the contactor;
h) heating the TEG by firing the reboiler with the flash gas from the flash tank;

i) burning the flash gas in a burner associated with a vent stack of the reboiler when not firing the reboiler with the flash gas; and j) circulating dry TEG from the still to the flash tank.

10. A method in accordance with claim 9, further comprising:
circulating dry TEG from the still to the flash tank with a heat trace during winter operation; and
by-passing the heat trace during summer operation.

11. A method in accordance with claim 9, further comprising:
directing dry TEG from the still to a flash gas contactor on the flash tank.

12. A method in accordance with claim 9, further comprising:
maintaining a temperature of the TEG in the reboiler within at least a 50 degree temperature range.

13. A method in accordance with claim 9, further comprising pumping the TEG with a pump, and without a jet gas system.

14. A method in accordance with claim 9, further comprising:
washing the flash gas to remove moisture and heavy hydrocarbons in the winter.

15. A method in accordance with claim 9, further comprising:
burning all of the flash gas in the reboiler without venting or flaring the flash gas.

16. A natural gas dehydration system, comprising:
a) a contactor, a flash tank, and a still interconnected by a desiccant circulation system with dry desiccant entering the contactor along with wet gas to absorb water vapor and leave the contactor as wet desiccant, the wet desiccant entering and leaving the flash tank with flash gas separating in the flash tank, and the wet desiccant entering the still with the water vapor vaporizing and leaving as dry desiccant returning to the contactor; and
b) a reboiler coupled to the still and the flash tank to burn the flash gas from the flash tank and heat the desiccant;
c) a burner associated with a vent stack of the reboiler to burn the flash gas from the flash tank when not firing the reboiler; and
d) a flash as contactor disposed on the flash tank and coupled to the dry desiccant.

17. A system in accordance with claim 16, further comprising:
a heat trace coupled in-line between the dry desiccant returning to the contactor and the flash tank.

18. A system in accordance with claim 17, further comprising:
a heat trace bypass coupled in-line between the dry desiccant returning to the contactor and the flash tank.

19. A system in accordance with claim 16, further comprising:
the burner being coupled to the vent stack of the reboiler at substantially a 45 degree angle.

20. A method for dehydrating natural gas, comprising:
a) circulating a desiccant between a contactor, a flash tank and a still with a reboiler;
b) introducing wet gas into the contactor with dry or lean desiccant, the dry or lean desiccant absorbing water vapor from the wet gas resulting in a rich or wet desiccant and dry gas;
c) extracting flash gas from the rich or wet desiccant in the flash tank;
d) removing the water vapor from the rich or wet desiccant in the still by heating the rich or wet desiccant to vaporize the water vapor resulting in the dry or lean desiccant;
e) recirculating the dry or lean desiccant from the still to the contactor;
f) firing the reboiler with the flash gas from the flash tank;
g) burning flash gas in a burner associated with a vent stack of the reboiler when not firing the reboiler with the flash gas;
h) passing rich or wet desiccant after the contactor and before the flash tank through a heat exchanger along with dry or lean desiccant from the still on the way to the contactor; and
i) passing rich or wet desiccant after the flash tank and before the still through another heat exchanger along with dry or lean desiccant from the still on the way to the contactor.

21. A method in accordance with claim 20, further comprising:
circulating dry or lean desiccant from the still to the flash tank.

22. A method in accordance with claim 20, further comprising:
directing dry or lean desiccant from the still to a flash gas contactor on the flash tank.

* * * * *